March 12, 1968  A. H. JAGELER  3,372,584
OFFSHORE LOGGING
Filed July 19, 1965  3 Sheets-Sheet 1
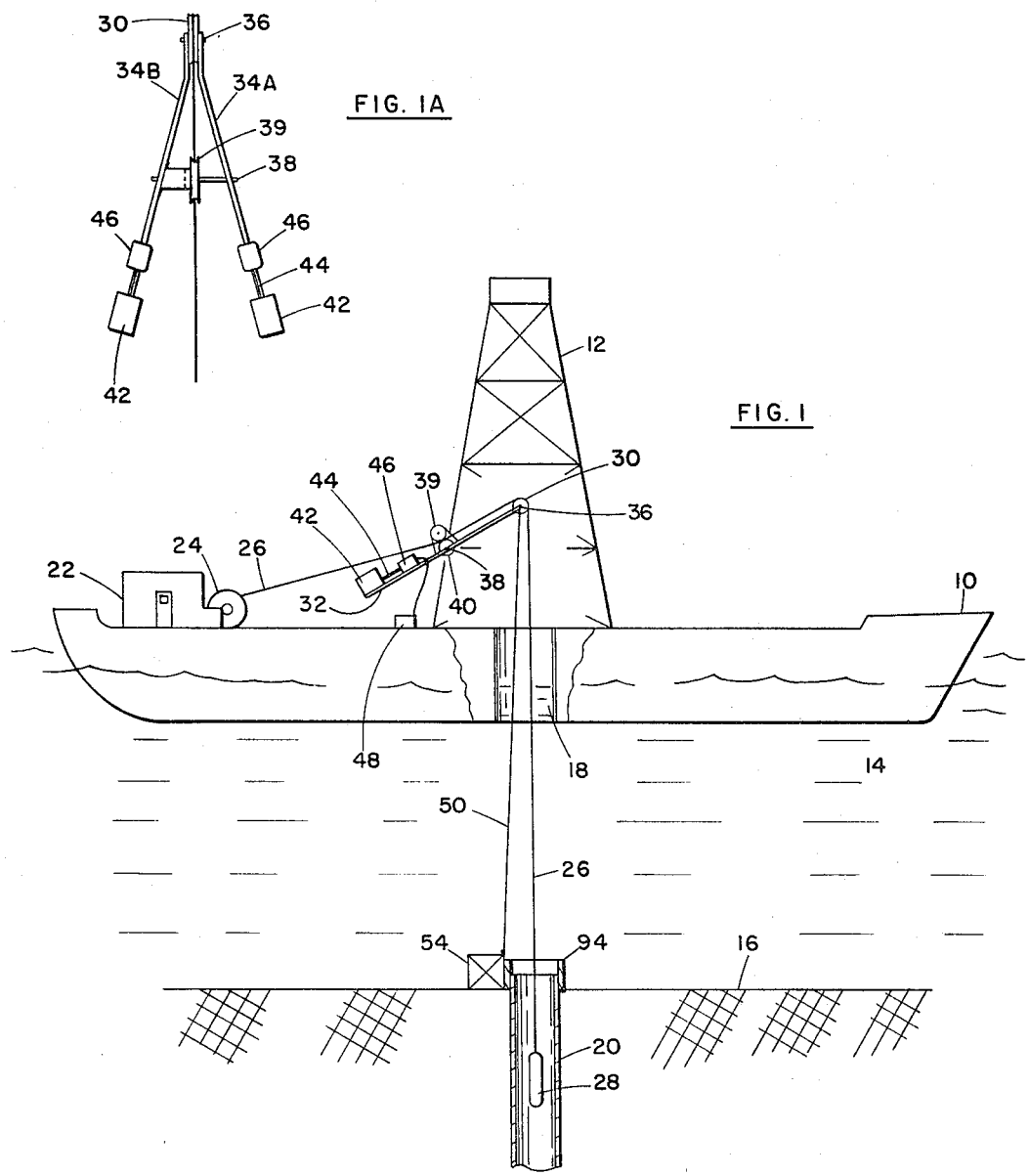
ALFRED H. JAGELER
*INVENTOR.*
BY John D. Gassett
*ATTORNEY.*

March 12, 1968  A. H. JAGELER  3,372,584
OFFSHORE LOGGING

Filed July 19, 1965  3 Sheets-Sheet 2

ALFRED H. JAGELER
INVENTOR

BY John D. Gassett

ATTORNEY.

March 12, 1968  A. H. JAGELER  3,372,584
OFFSHORE LOGGING

Filed July 19, 1965  3 Sheets-Sheet 3

ALFRED H. JAGELER
INVENTOR.

BY John D. Gassett

ATTORNEY.

United States Patent Office 3,372,584
Patented Mar. 12, 1968

3,372,584
OFFSHORE LOGGING
Alfred H. Jageler, Tulsa, Okla., assignor to Pan American Petroleum Corporation, Tulsa, Okla., a corporation of Delaware
Filed July 19, 1965, Ser. No. 473,147
8 Claims. (Cl. 73—152)

ABSTRACT OF THE DISCLOSURE

This concerns an apparatus for compensating for vertical movement of a ship in logging a borehole therefrom. A flexible logging line goes from a conventional recorder over a logging line pulley for supporting a logging device in a borehole beneath the floating vessel. An arm is pivotally connected to the vessel and supports the logging line pulley a fixed distance from the pivotal connection. Sensing means for detecting the vertical movement of the vessel is provided and includes means for moving the arm about its pivot thus raising or lowering the pulley to compensate for such vertical movement. In one embodiment, the sensing means includes a sonar detector attached to the floating vessel for continuously detecting the distance between the vessel and the bottom of the body of water.

---

This invention relates to the art of logging well bores. It relates especially to the logging of well bores drilled in marine locations and particularly to a system for compensating for vertical movement of a floating vessel from which logging operations are conducted.

It has become a rather common practice to run logs in most wells drilled in the earth for the production of oil and gas. Such logs may be run to determine a measure or indication of subsurface information such as porosity, permeability, fluid content and the like. Such logs include the commonly called electric log, gamma log, velocity log, etc. In obtaining these logs, a logging device is used which contains the sensing equipment and is adapted to be lowered into a well bore. Means are provided for moving the logging device vertically in the well bore and for accurately recording the depth of the logging tool while the measurements are being recorded so that it is known with accuracy the depth where any portion of the resulting log is made.

These same logging techniques which are used on wells drilled on land locations are also quite useful for wells drilled in marine locations. However, many wells drilled in marine locations are drilled from a floating vessel. This presents a problem. The vessel will rise and fall with waves or swell actions such that the ship is at varying heights above the floor of the bed of water supporting the vessel. When logging operations are run from such floating vessel using land equipment for raising and lowering the logging device, serious errors are introduced into the recording of the logs. If a correct logging operation is to be performed, then it is seen that there must be means provided to compensate for the vertical movement of the floating vessel. Accordingly it is an object of this invention to provide such means.

In accordance with one aspect of this invention unique means are provided to vary the configuration of the path of the logging cable from the recording tool through the well in the floating vessel so that the distance of such path from the recorder to the ocean floor is constant. In a preferred embodiment, the logging cable is supported from the ship over a support sheave wheel which holds the cable directly over the well being logged. Means are provided to maintain this sheave wheel at essentially a constant vertical position with respect to the ocean floor. The support sheave is supported by a walking beam which is pivotally supported from the frame of the drilling ship. The end of the walking beam opposite the sheave has a weight for balancing the weight of the cable and logging device during logging. One end of a dead-weight anchor line is connected to a weight on the ocean floor. This weight can, for example, be the well head equipment. When the ship moves vertically the pivot point moves vertically as does the weight on the walking beam. However, the upper sheave supporting the logging cable cannot move vertically. It is "tied" down by the anchor line which is of a selected length to maintain the support sheave at the proper height above the ocean floor. Any upward tendency of the sheave is restrained by the dead-weight anchor and any downward movement is restrained by the balancing weight on the opposite end of the walking beam. Arrangements are provided so that the distance of the path of the logging cable from the supporting sheave to the recorder is essentially constant for any vertical position of the sheave within reasonable limits. The remaining length of the cable, that is that part from the supporting sheave to the ocean floor is constant as the vertical position of the supporting sheave is fixed. Thus the length of the path of the cable from the recorder to the top of the well bore is fixed. Thus in this embodiment logging operations can be conducted to obtain correct depth indications although the ship may have considerable vertical movement due to waves or swell actions of the sea.

Other objects and a better understanding of the invention can be had from the following description taken in conjunction with the drawings in which:

FIGURE 1 illustrates one means of compensating for wave action including a weighted walking beam configuration;

FIGURE 1A illustrates a top view of the walking beam illustrated in FIGURE 1;

Figure 3:
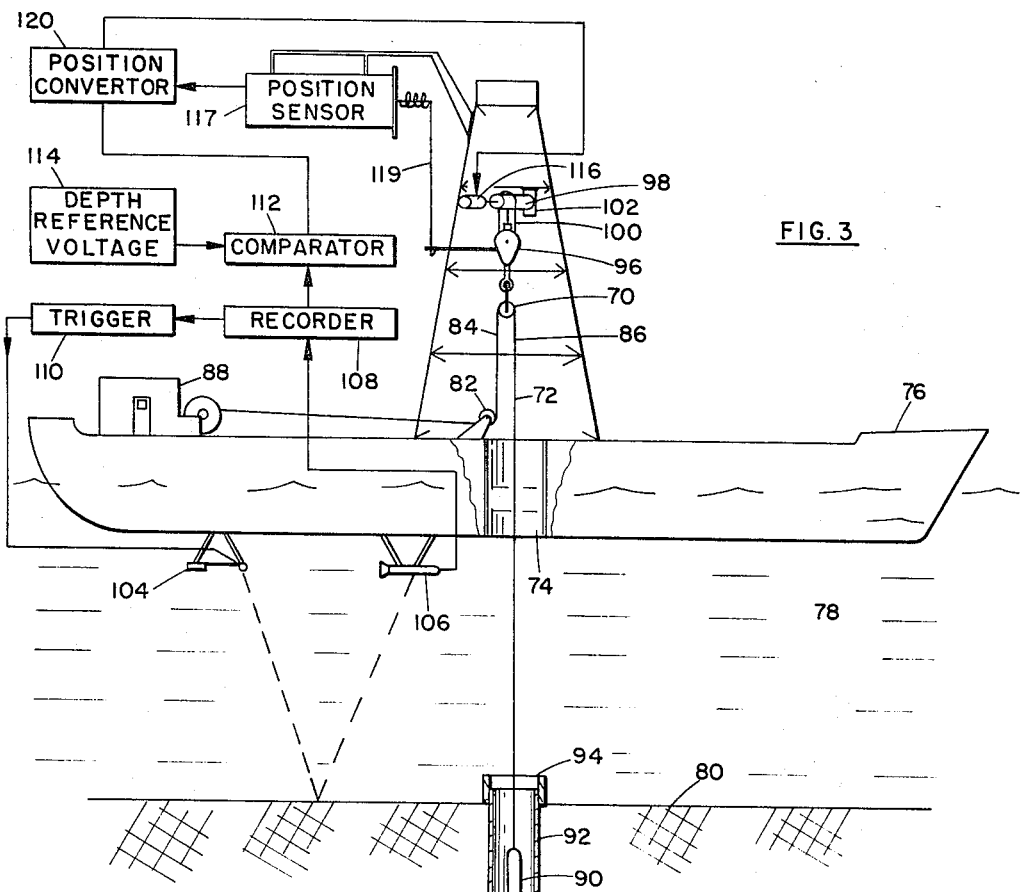
FIGURE 3 illustrates another embodiment of this invention.

Turning to the drawing and FIGURE 1 in particular there is illustrated a floating vessel or ship 10 carrying a drilling structure 12 and floating on a body of water 14 having a bottom 16. Floating vessel 10 has an open well 18 through which drilling tools, logging tools and the like can be run.

Well 18 of ship 10 is positioned directly above well 20 which has been drilled in the ocean floor. Special marine positioning equipment is commercially available for positioning a floating vessel at a selected location. It is therefore not necessary to go into detail of this phase.

Mounted on ship 10 is a logging unit 22 which can be any desirable logging unit, many of which are commercially available. This logging unit has a drum 24 upon which is wound logging cable 26. Drum 24 supplies the power for raising and lowering the logging tool 28 which is supported by cable 26. Logging cable 26 serves also as a means of transmitting signals between the logging tool and the logging unit. Logging cable 26 is supported directly over well 20 by support sheave 30. Means for supporting sheave 30 and for maintaining it in a fixed position with respect to the ocean floor will now be discussed. Sheave 30 is mounted on walking beam 32 which preferably is an A-frame walking beam having legs 34A and 34B as is shown more clearly in FIGURE 1B. Support sheave 30 is rotatably mounted between the adjacent ends of legs 34A and 34B on shaft 36. At approximately the center of the walking beam, legs 34A and 34B are supported from the ship by an axle or shaft 38. Supported between legs 34A and 34B and upon shaft 38 is a center sheave 40. A mating sheave 39 is supported from A-frame 34 adjacent sheave 40 such that between sheaves 40 and 30 line 26 is parallel to the plane of the A-frame for all angular positions of the A-frame.

The ends of legs 34A and 34B opposite supporting sheave 30 are each provided with weights 42 to counterbalance the weight of the logging device which is supported in the borehole. These weights can be adjusted along the A-frame walking beam as necessary for proper balancing. Means for adjusting the weight can include a threaded shaft 44 which is designed to match the internal threads of a bore through weight 42. The rotation of shaft 44 is controlled by motor 46. Thus all that is necessary to do to adjust weight 42 is to energize motor 46 to rotate shaft 44 as desired. Motor 46 can be electrically operated by control 48 in a well known manner by controlling the electrical energy thereto from a source not shown.

A dead-weight line 50 is attached to walking beam 32 at shaft 36 of sheave 30. The lower end of line 50 is connected to an anchor such as a dead-weight 54, or, if desired, to the well head equipment 94. By having the dead-weight line connected to shaft 36, there is no error introduced by rotation about the point to which the line 50 is attached.

Center sheave 40 is provided to support the logging cable when the center of the pivot point of the A-beam is high or higher vertically than support sheave 30. A positioning sheave 39 is supported from the walking beam adjacent center sheave 40 to maintain the logging cable in center sheave 40 for all rotational positions. It is thus seen that the length of the path of logging cable 26 from center sheave 40 to drum 24 of logging unit 22 is a constant distance as the two points are fixed to the sheave and thus fixed with respect to each other. The length of the line from center sheave 40 to support sheave 30 is a constant value as the two sheaves are each fixed to the A-frame. The only other length of the path of logging cable 26 to consider at this time is its length from support sheave 30 to the well head or ocean floor. As sheave 30 is held in nearly a fixed elevation, the length of this portion of the path is nearly constant. As will be shown the error introduced is extremely small and is considered inconsequential.

Figure 2:
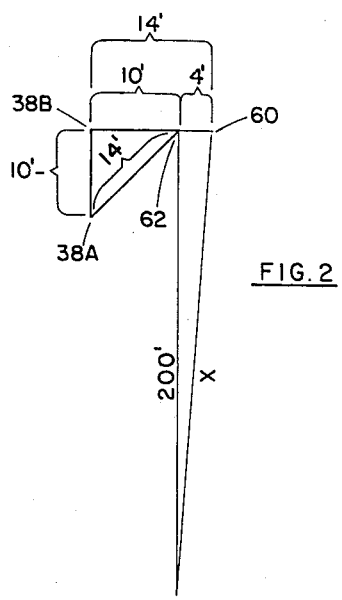
FIGURE 2 is a geometrical configuration useful for showing the smallness of the error in using the device of FIGURE 1.

Attention is next directed to FIGURE 2 to illustrate that the distance of path of the logging cable from center sheave 40 to the ocean floor is substantially constant for different angular positions with the horizontal of the walking beam. For purposes of illustration let it be assumed that the walking beam is 14 feet in length from the pivot point of center sheave 40 to shaft 36 of supporting sheave 30. Let it further be assumed that there is a wave action of 10— feet so that the ship in its first position is such that pivot point 38 is at position 38A in FIGURE 2 and in its second position rises 10— feet to position 38B. As the ship is positioned accurately above the well bore by automatic positioning means, movement of the ship is essentially vertically, up or down. Let it be assumed that the support sheave 30 at point 62 is 200 feet above the ocean floor when the ship is in its lower position as can readily be seen from FIGURE 2. The path of cable 26 from the ocean floor to pivot point 38A is 14 feet plus 200 feet or 214 feet. When the pivot point or shaft 38 of center sheave 40 moves upwardly 10+ feet pivot point 38B is approximately the same elevation as supporting sheave 30. At this position the walking beam is horizontal and extends 14 feet horizontally from point 38B so that support sheave 30 is positioned at point 60.

As point 38B is directly above 38A due to the vertical movement and non-horizontal movement of the ship, point 60 is 4 feet horizontally from point 62, the prior position of support sheave 30. To determine the length of the path from point 38B to point 60 to the ocean floor one adds 14 feet, the length of the beam from the pivot to point 60, plus the distance $x$ which is the straight line distance from point 60 to the ocean floor. The distance $x$ is equal to the square root of $200^2+4^2$ or the square root of 40,016 which is 200.04. The length of the path from pivot 38B is in the position illustrated in FIGURE 2 and is seen to be 214.04 feet which is essentially no error. As the vertical distance between the ocean floor and support sheave 30 increases or decreases the error will increase or decrease by the ratio $200/D$ where D is the new vertical distance. From this it can be seen that the error, for this example, will never increase beyond .4 of a foot assuming a 20 foot minimum distance between the ship bottom and the ocean floor.

Attention is now directed toward FIGURE 3 which illustrates another embodiment of this invention. In this figure there is a support sheave 70 for supporting cable 72 through well 74 in ship 76 which is supported on a body of water 78 having a bottom 80. Means are provided to maintain a vertical loop in cable 72 and to vary the length or vertical dimension of this loop in accordance with the rise or fall of vessel 76 with respect to the ocean floor 80. The loop is obtained by having a deck pulley 82 arranged adjacent well 74 so that line segment 84 is approximately vertical and is parallel to segment 86. Segment 86 for purpose of illustration will be considered to be the same length as segment 84 and extends from sheave 70 to the deck of the ship. In other words, that part of cable 72 which is above a horizontal plane drawn through deck pulley 82 will be called the loop. Line 72 passes under deck pulley 82 to a log recorder 88 which can be similar to logging unit 22 of FIGURE 1.

At the lower end of logging cable 72, logging device 90 is supported in well 92 which has been drilled into the ocean floor 80. Well head equipment 94 is indicated and can be any suitable equipment. Means will now be considered for changing the length of the loop (segments 84 and 86) of drilling cable 72 as a function of the vertical movement of the ship. This includes support means for moving support sheave 70 with respect to the ship and control means for sensing the vertical movement of the ship. The control means causes the support means to move support sheave 70 according to the vertical movement sensed. Means for supporting sheave 70 includes a block assembly 96 to which support sheave 70 is secured and a drum 98 having line 100 wound about it for supporting and moving block assembly 96. Drum 98 is supported by frame 102 in a fixed position above the deck of ship 76.

Attention is now directed toward that part of FIGURE 3 for sensing vertical movement of the ship with respect to the ocean floor. In this embodiment a sonic depth meter attached to the bottom of a vessel is used to continually detect the depth from the vessel to the bottom of the body of water. Such depth meters are well known and can include a boomer transducer 104 and a hydrophone 106, each of which are attached to the bottom of the vessel. The detected depth is recorded on a recorder 108 which through trigger means 110 controls boomer transducer 104. Suitable sonar depth meter assemblies are commercially available; for example from Edgerton Germeshausen and Grier, Inc., 160 Brookline Ave., Boston 15, Mass., and described in their Oceanographic Catalog 0–62. Their Model 250 Sonar Recorder is provided with connections for an oscilloscope display of the signal being recorded. In FIGURE 3 this connection is made to a comparator 112 so that a comparison can be made with a fixed voltage from depth voltage reference source 114. A constant voltage is thus fed from unit 114 to comparator 112 and the constant voltage compared with the output voltage from recorder 108. The output voltage from recorder 108 is indicative of the depth of the ocean floor beneath the ship. The difference of the output voltage and the reference voltage is a measure of the vertical movement of the ship. Comparator 112 can be a relatively simple voltage differential unit. Thus the output of comparator 112 is a voltage which varies in amplitude and sign with respect to the reference voltage according to the vertical movement of ship 76. This voltage difference is used to control power means 116 which drives drum 98. Means of positioning one member in accordance with the level of a control voltage are well known and will therefore not be discussed here in any great detail. It can, for example, include a position sensor 117 supported from the ship. The sensor can be a potentiometer having a spring loaded line 119 which varies the position of the potentiometer wiper arm so that the potential of the output of the potentiometer varies as a function of position of block 96. The output of sensor 117 is fed to position converter 120 which monitors the input voltage to control motor 116 to properly position block 96.

The difference voltage at any particular instant is a measure of a given vertical movement of the ship. This is translated into a given rotation of drum 98 such that sheave 70 is lowered one unit of movement for every two units of movement the ship moves up and is raised one unit for every two units the ship is lowered. This changes the length of the "loop" one unit for two units of movement of the ship. As one unit of length of the "loop" includes two units of length of the logging cable making up the loop, this maintains the distance of cable 72 from deck pulley 82 to the ocean floor constant. Thus as this distance is maintained constant it is readily seen that the up and down movement of the ship has no effect on the logging operation as the recorder sees only the movement of logging device 90.

Figure 4:
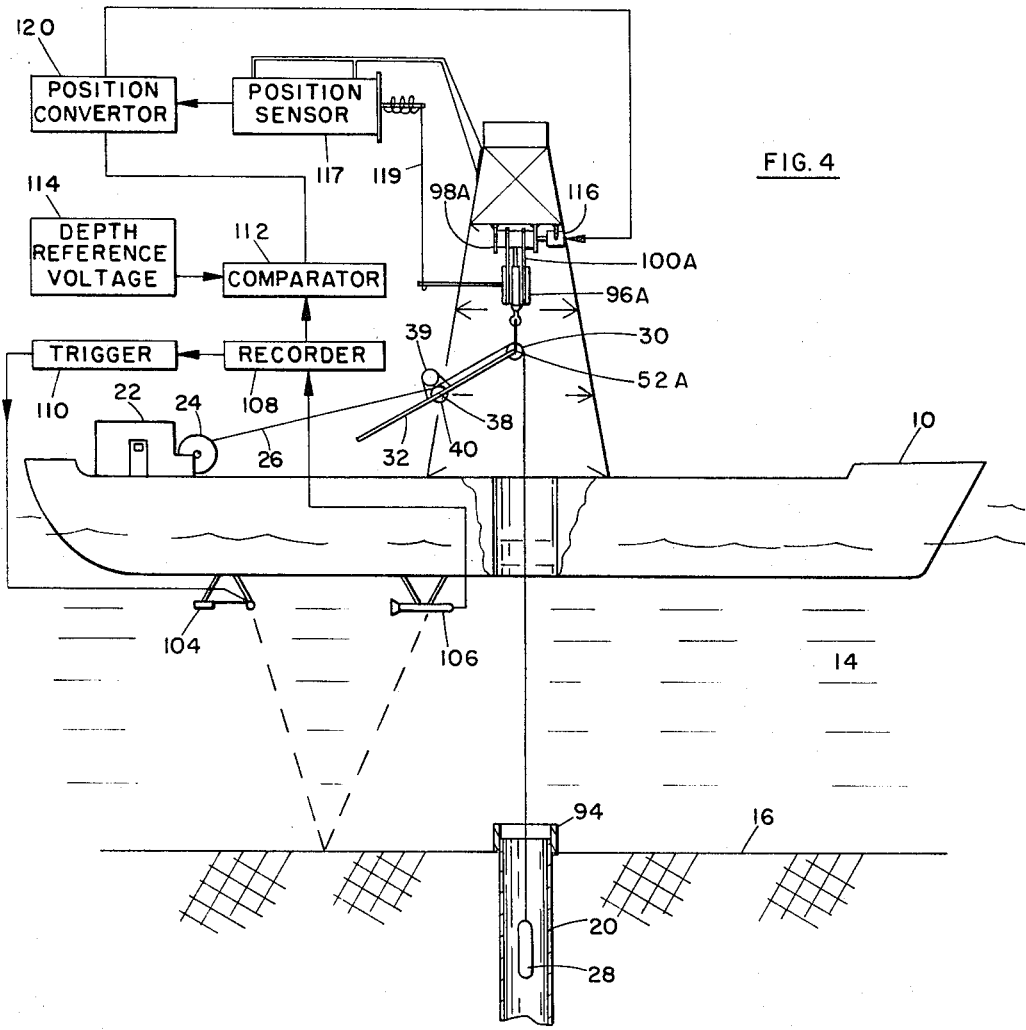
FIGURE 4 illustrates a modification of the embodiment shown in FIGURE 1.

The embodiment of FIGURE 1 can be modified to incorporate the vertical movement sensing device of FIGURE 3. Such modification is shown in FIGURE 4. In FIGURE 4 the dead-weight line has been removed. In its place the sensing means of FIGURE 3 have been added. The walking beam has been modified as balancing weights are no longer necessary. Support sheave 30 is held in a constant position by a block assembly which counteracts the weight of the logging tool. Point 52A of the walking beam is connected to block assembly 96A whose line 100A is connected to a drum 98A. Drum 98A is powered and controlled in a very similar manner to that of drum 98 of FIGURE 3. The main difference is that drum 98A is controlled so that block 96A has vertical movement equal to that of the ship. If the ship moves up one unit block 96A goes down one unit and likewise if the ship goes down one unit of distance block 96A goes up one unit. Thus sheave 30 is maintained in a position fixed vertically similarly as in FIGURE 1. Therefore vertical movement of the ship is compensated for by maintaining support sheave 30 in a constant position fixed vertically.

While there are disclosed above a limited number of specific embodiments of this invention, various modifications can be made thereto without departing from the invention concept. Therefore it is desired that the invention be measured only by the following claims.

I claim:

1. An apparatus for logging a borehole from a floating vessel supported by a body of water which comprises:
   a logging device adapted to be moved through a borehole;
   a non-resilient flexible member for supporting said logging device;
   means fixed to said vessel for moving said flexible member;
   a pulley means for supporting said flexible member above said boreholes;
   an arm means pivotally connected to said vessel and supporting said pulley means a fixed distance from the pivotal connection;
   sensing means for sensing vertical movement of said vessel and including means for moving said arm means about said pivotal connection in response to such vertical movement.

2. An apparatus as defined in claim 1 in which said arm member includes a walking beam means extending beyond said pivotal connection in the opposite direction from said pulley means and having a balancing weight thereon, an anchor means, and a line means connecting said anchor means to said arm adjacent said pulley means.

3. An apparatus as defined in claim 2 including means for moving said weight with respect to said pivotal connection.

4. An apparatus as defined in claim 1 in which said sensing means includes a sonar detector attached to the floating vessel for continually detecting the distance between said vessel and the bottom of the body of water.

5. The apparatus of claim 2 in which said anchoring means is a part of an underwater well head of said borehole.

6. An apparatus for logging a borehole from a floating vessel which comprises:
   a logging device adapted to be moved through said borehole;
   a non-resilient flexible member for supporting said logging device;
   sheave means supporting said flexible member such that an intermediate section of said flexible member is held in parallel segments forming a loop, said sheave means including two vertically spaced pulleys, the lower of said pulleys fixed to said vessel such that two segments of said flexible member are parallel to each other;
   sensing means for sensing the vertical movement of said vessel, said sensing means including means to move said upper pulleys one unit of vertical movement of opposite direction for every two units of vertical movement of said vessel, said sensing means including a sonar detector secured to said floating vessel for continually detecting variations of distance between said vessel and the bottom of the body of water.

7. An apparatus for logging a borehole from a floating vessel supported by a body of water above a well bore drilled in the earth, said vessel having a well therethrough, which comprises:
   a logging device adapted to be moved through a borehole;
   a cable for supporting said logging device;
   a walking beam;
   pivot means pivotally supporting said walking beam about a horizontal axle from said floating vessel;
   a center sheave rotatably supported on the same axle as said walking beam;
   a support sheave placed at one end of said walking beam to support said cable above said well in said ship;
   a positioning sheave supported from said floating vessel and positioned circumferentially adjacent said center sheave said cable being supported between the grooved rims of said center sheave and said positioning sheave;
   means fixed to said vessel including means for moving said cable and for recording information from said logging device;
   an anchor means;
   an anchor line connecting said anchor means to the axle of said support pulley;
   a balancing weight on said walking beam on the opposite side of said pivotal connection from said positioning sheave.

8. An apparatus as defined in claim 7 including means for moving said weight along said walking beam with respect to said pivotal connection.

References Cited
UNITED STATES PATENTS

| | | | |
|---|---|---|---|
| 2,156,052 | 4/1939 | Cooper | 73—152 X |
| 2,809,435 | 10/1957 | Nicholson et al. | |
| 2,852,936 | 9/1958 | Broussard | 73—152 |
| 3,001,396 | 9/1961 | Cleveland | 73—152 |

FOREIGN PATENTS 857,627   1/1961   Great Britain.

OTHER REFERENCES

Munske, R. E.: Progress on Mohole, from Undersea Technology, vol. 4, No. 12, December 1963, pp. 17 and 18.

RICHARD C. QUEISSER, *Primary Examiner.*

JAMES GILL, *Examiner.*

JERRY W. MYRACLE, *Assistant Examiner.*